United States Patent Office 3,708,588
Patented Jan. 2, 1973

3,708,588
COMPOSITIONS AND METHODS OF USE FOR PREVENTING PREGNANCY IN WARM-BLOODED ANIMALS USING 4-PHENYL-BICYCLO[2.2.2]OCTANE, AND OCT-2-ENE, -1-CARBOXYLATES
Paul Edward Aldrich, 306 Spalding Road, Sharpley, Wilmington, Del. 19803, and Edward Charles Hermann, 8 Calgary Road, Newark, Del. 19711
No Drawing. Continuation-in-part of abandoned application Ser. No. 688,973, Dec. 8, 1967. This application Nov. 16, 1970, Ser. No. 90,008
Int. Cl. A61k 9/04, 27/12
U.S. Cl. 424—317     8 Claims

ABSTRACT OF THE DISCLOSURE

This disclosure teaches the method of using 4-phenyl-bicyclo[2.2.2]octane, and oct-2-ene, -1-carboxylates as antifertility agents. The disclosure further teaches of pharmaceutical compositions employing said compounds.

CROSS-REFERENCE TO RELATED APPLICATION

This is a continuation-in-part of our copending application Ser. No. 688,973, filed Dec. 8, 1967, now abandoned.

BACKGROUND OF THE INVENTION

This invention relates to methods of using 4-phenyl-bicyclo[2.2.2]octane, and oct-2-ene, -1-carboxylates as antifertility agents in warm-blooded animals and to compositions containing an effective amount of one or more of said compounds.

Prior to our invention, some of the compounds within the scope of this invention were known. These compounds are known to be useful as intermediates in the synthesis of 4-phenylbicyclo[2.2.2]octane-1-amines and salts thereof. These amines are useful as antidepressant agents. As can be seen from the disclosure of U.S. Pat. No. 3,308,160, the only known use for the compounds within the scope of this invention was as an intermediate in the preparation of the corresponding amine.

There are, at present, antifertility agents known to the medical arts. The agents which are known to be most effective for preventing pregnancy are estrogens and progestins.

Presently, the most widely accepted of these pharmaceutical agents comprise mixtures of steroidal estrogens and progestins. When these agents are administered, a pseudopregnancy is established and ovulation is prevented. In order to induce this pseudopregnant condition, these agents are administered orally for about twenty days of the menstural cycle. Although they are quite effective, this dosage regimen can result in side effects. The most commonly occurring side effects are similar to the symptoms observed during pregnancy. These side effects include nausea, occasional vomiting, dizziness, headache, breast enlargement and pigmentation of the nipples, particularly during the first cycle in which these agents are administered.

The fact that these agents require a cyclic administration regimen also presents a problem. They must be administered without fail each day of the 20-day period or there is a danger of breakthrough bleeding.

We have discovered that the compounds of this invention can be used in an entirely different manner to prevent pregnancy. Whereas the estrogen-progestin mixtures now most widely used must be taken for relatively long periods in anticipation of coitus, the compounds for this invention can be administered after coitus to prevent pregnancy. Although the exact mechanism of action is not well understood, animal studies indicate that, probably nidation is in some manner prevented.

It, therefore, appears that the compounds of this invention exhibit a mechanism of action materially different from the mechanism of action of presently employed contraceptive drugs.

This new mechanism of action has numerous practical advantages such as ease of use, elimination of protracted periods of administration, elimination of a scheduled regimen of medication, and the avoidance of a continual state of psuedopregnancy which is responsible for many side effects.

SUMMARY OF THE INVENTION

In summary, we have discovered a method for preventing pregnancy in animals which comprises administering to the female animal an effective amount of a compound of the formula:

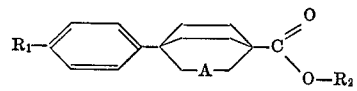

wherein

A can be a single bond or a double bond;
$R_1$ can be hydrogen, HO—, $H_3CO$—, $H_5C_2O$—, $H_7C_3O$—, $H_9C_4O$—, or

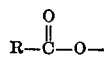

where R is hydrogen, alkyl of one through twelve carbons; and
$R_2$ can be —H, alkyl of one through four carbons or Me⊕ where Me⊕ is a non-toxic pharmaceutically acceptable salt-forming cation such as sodium, potassium, magnesium or ammonium.

Compounds of the above formula in which A is as defined above; $R_1$ is hydrogen, HO—, $H_3CO$—, $H_5C_2O$—, and

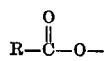

where R is an alkyl of one through four carbons; and $R_2$ is hydrogen, methyl, ethyl, sodium, potassium or ammonium are preferred.

Another aspect of our invention is a formulation in which one or more of the 4-phenylbicyclo[2.2.2]octane, and oct-2-ene, -1-carboxylates of this invention, in an amount sufficient to prevent pregnancy, are mixed with suitable pharmaceutical carriers for administration to mammals.

DESCRIPTION OF THE INVENTION

Compounds for use in the method of this invention include 4-phenyl and substituted phenylbicyclo[2.2.2] octane-1-carboxylic acid and carboxylic acid esters, 4-phenyl and substituted phenylbicyclo[2.2.2]oct-2-ene-1-carboxylic acid and carboxylic acid esters, and salts of the above.

For the purposes of this description, the term phenyl is intended to mean phenyl and phenyl substituted para to the attachment on the bicyclooctane ring. These compounds are represented by the formula:

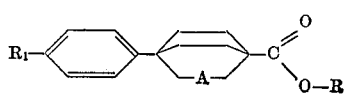

wherein:
A can be a single bond or a double bond;
$R_1$ can be hydrogen, —OH, —OCH$_3$, —OC$_2$H$_5$, —OC$_3$H$_7$, —OC$_4$H$_9$, or

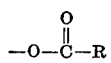

where R is H, alkyl of 1 through 12 carbons, and
$R_2$ can be —H, alkyl of one through four carbons, or Me$^\oplus$ where Me$^\oplus$ is a non-toxic pharmaceutically acceptable salt-forming cation such as sodium, potassium, magnesium or ammonium.

In general, these compounds are prepared from acetophenone or a substituted acetophenone. The desired acetophenone is treated with diethylethoxymethylenemalonate in ethyl alcohol in the presence of sodium ethoxide under a nitrogen atmosphere. The intermediate thus formed is cyclized to a pyrone by treatment with anhydrous hydrogen fluoride.

The pyrone is dissolved in an inert solvent, such as benzene, and is heated with ethylene under pressure to give the corresponding 4-phenylbicyclo[2.2.2]oct-2-ene-1-carboxylic acid ethyl ester. This ester can be isolated by evaporating off the solvent.

If the corresponding bicyclooctane compound is desired, the 4 - phenylbicyclo[2.2.2]oct-2-ene-1-carboxylic acid ethyl ester can be reduced in the presence of a hydrogenation catalyst in a suitable solvent such as ethanol or weak acid to give corresponding 4-phenylbicyclo[2.2.2] octane-1-carboxylic acid ethyl ester.

When the free carboxylic acid is desired, this can be obtained from the ester by alkaline hydrolysis. The free acid can be precipitated out of solution by acidifying the reaction system and then isolated using conventional techniques.

When the 4-phenylbicyclo[2.2.2]oct-2-ene-1-carboxylic acid is isolated in this fashion and the octane acid is desired, this can be obtained by catalytically hydrogenating the 4-phenylbicyclo[2.2.2]oct-2-ene acid.

For a more clear understanding of how the compounds for use in the method of this invention are obtained, the following examples are presented.

EXAMPLE 1

3-carboethoxy-6-phenyl-2-pyrone

A mixture of 240 parts of acetophenone and 432 parts of diethylethoxymethylenemalonate is dropped into a flask containing a solution of 50.6 parts of sodium metal in 2000 parts of absolute alcohol under a nitrogen atmosphere. The mixture is refluxed for 2 hours with stirring and is allowed to cool. About 1000 to 1500 parts of alcohol is removed by evaporation at reduced pressure, and sufficient ether is added to form a granular or powdery yellow precipitate. The precipitate is filtered off, washed with ether, and dried.

The crude yellow precipitate is added to 692 parts of anhydrous hydrogen fluoride at —60 to —70° C. The mixture is allowed to warm to room temperature and the excess hydrogen fluoride is then evaporated. Dichloromethane and water are added to the residue. The dichloromethane extract is washed with dilute NaHCO$_3$ solution, dried with anhydrous MgSO$_4$, and then evaporated. The residue is triturated with ethyl acetate to give the corresponding 3-carboethoxy-6-phenyl-2-pyrone, M.P. 107–109° C.

EXAMPLES 2 AND 3

The process of Example 1 is repeated but substituting an equivalent amount of the indicated substituted acetophenone for the acetophenone used in Example 1 to obtain the indicated pyrone.

| Example | Substituted acetophenone | Pyrone |
| --- | --- | --- |
| 2 | p-Methoxyacetophenone. | 3-carboethoxy-6-(p-methoxyphenyl)-2-pyrone, M.P. 112–114° C. |
| 3 | p-Ethoxyacetophenone. | 3-carboethoxy-6-(p-ethoxyphenyl)-2-pyrone, M.P. 124.5–125° C. |

EXAMPLE 4

A solution of 0.2 mole of 3-carboethoxy-6-phenyl-2-pyrone in 200 ml. of benzene is heated at 200° C. with 1000 atmospheres of ethylene for 16 hours in a suitable pressure vessel. The mixture is cooled. The benzene is evaporated and the residue is distilled to give 4-phenylbicyclo[2.2.2]oct-2-ene-1-carboxylic acid ethyl ester, B.P. 192° C. at 12 mm. Hg. The ester is dissolved in methanol and cooled to —10° to give crystals, M.P. 49–49.5° C. Gas chromatography [0.25% phenylmethylsilicone resin (50% phenyl) on glass beads] of the ester indicates a single component. The following spectral and analytical data are consistent with the assigned structure: N.M.R. (CDCl$_3$ with TMSi as a reference) 7.37 p.p.m. (m, 5H), 6.53 (AB qt., 2H, J=8 cps.), 4.27 (qt., 2H, J=7 cps.), 1.78 (m, 8H), 1.32 (tp., 3H, J=7 cps.); I.R. 5.65µ (ester carbonyl), 13.37 and 14.40µ (monosubstituted benzene).

Analysis.—Calcd. for C$_{17}$H$_{20}$O$_2$ (percent): C, 79.65; H, 7.86. Found (percent): C, 79.75; H, 7.80.

Baker and Stock, 32, J. Org. Chem., 3344–3348, (1967), report a compound which they identify as ethyl 4-phenylbicyclo[2.2.2]oct-2-ene-1-carboxylate, M.P. 125–126.5° C., for which they report no elemental analysis. Since no data supporting the suggested structure is presented by the authors, it is possible that their assignment of structure is incorrect.

EXAMPLES 5 AND 6

The procedure of Example 4 is repeated substituting an equivalent amount of the listed pyrone for the 3-carboethoxy-6-phenyl-2-pyrone of Example 4 to obtain the indicated bicyclooctene product.

| Ex. | Pyrone | Bicyclooctene |
| --- | --- | --- |
| 5 | 3-carboethoxy-6-(4-methoxyphenyl)-2-pyrone. | 4-(p-methoxyphenyl)-bicyclo[2.2.2]oct-2-ene-1-carboxylic acid ethyl ester, B.P. 172° C. (0.6 mm.Hg.). |
| 6 | 3-carboethoxy-6-(4-ethoxyphenyl)-2-pyrone. | 4-(p-ethoxyphenyl)-bicyclo[2.2.2]oct-2-ene-1-carboxylic acid ethyl ester, B.P. 172° C. (0.35 mm.Hg.). |

EXAMPLE 7

A mixture of 0.2 mole of 4-phenylbicyclo[2.2.2]oct-2-ene-1-carboxylic acid ethyl ester, 200 ml. of gl. acetic acid, and 3 g. of 10% palladium on charcoal is hydrogenated at an initial pressure of 3 atm. in a shaker apparatus. When uptake of hydrogen is complete, the catalyst is filtered off, and the filtrate is evaporated at reduced pressure to give 4-phenylbicyclo[2.2.2]octane-1-carboxylic acid ethyl ester, B.P. 192° C. at 12 mm. Hg.

EXAMPLES 8 AND 9

The procedure of Example 7 is repeated substituting an equivalent amount of the listed bicyclooctene for the 4-phenylbicyclo[2.2.2]oct-2-ene-1-carboxylic acid ethyl ester of Example 7 to obtain the listed bicyclooctane carboxylic acid ethyl ester.

| Ex. | Bicyclooctene | Bicyclooctane |
| --- | --- | --- |
| 8 | 4-(p-methoxyphenyl)-bicyclo[2.2.2]-oct-2-ene-1-carboxylic acid ethyl ester. | 4-(p-methoxyphenyl)-bicyclo[2.2.2]octane-1-carboxylic acid ethyl ester, M.P. 85–87° C. |
| 9 | 4-(p-ethoxyphenyl)-bicyclo[2.2.2]oct-2-ene-1-carboxylic acid ethyl ester. | 4-(p-ethoxyphenyl)-bicyclo[2.2.2] octane-1-carboxylic acid ethyl ester, B.P. 170–172° C. (0.35 mm.Hg.). |

EXAMPLE 10

A mixture of 1.6 mole of 4-phenylbicyclo[2.2.2]oct-2-ene-1-carboxylic acid ethyl ester, 2.0 mole of sodium hydroxide, and 1000 ml. of diethylene glycol is heated at 160° C. for 2 hours under $N_2$. The mixture is cooled and is poured into 4000 ml. of $H_2O$. The solution is acidified with 400 ml. of 6 N HCl. The precipitate is filtered off, washed with $H_2O$, and dried to give 4-phenylbicyclo[2.2.2]oct-2-ene-1-carboxylic acid, M.P. 250.5–251° C.

The acid is sublimed at 0.05 mm. of Hg in an oil bath at 120° C. to give crystals, M.P. 251–2° C. The following spectral and analytical data are consistent with the assigned structure; N.M.R. (dimethyl sulfoxide-$d_6$ with TMSi as a reference) 12.4 p.p.m. (broad, 1H), 7.37 (m, 5H), 6.49 (AB qt., 2H, J=8 cps.), 172 (m, 8H); I.R. 3.3–4$\mu$ and 10.5$\mu$ (OH), 5.91$\mu$ (carboxyl C=O), 13.40 and 14.40$\mu$ (monosubstituted benzene).

*Analysis.*—Calcd. for $C_{15}H_{16}O_2$ (percent): C, 78.92; H, 7.06. Found (percent): C, 78.85; H, 7.06.

Baker and Stock, 32, J. Org. Chem., 3344–3348, (1967), report a compound which they identify as 4-phenylbicyclo[2.2.2]oct-2-ene-1-carboxylic acid, M.P. 291–292.5° C., which they obtain by the hydrolysis of the supposed ethyl ester, M.P. 125–126.5° C. While the hydrolysis product has the correct elemental analysis, no data supporting the suggested structure is presented. It is possible that the assigned structure is incorrect.

EXAMPLES 11–15

The procedure of Example 10 is repeated substituting an equivalent amount of the listed "Ester" for the 4-phenylbicyclo[2.2.2]oct-2-ene-1-carboxylic acid ethyl ester of Example 10 to obtain the listed "Acid."

| Ex. | Ester | Acid |
|---|---|---|
| 11 | 4-phenylbicyclo[2.2.2]octane-1-carboxylic acid ethyl ester. | 4-phenylbicyclo[2.2.2]-octane-1-carboxylic acid, M.P. 287–289° C. |
| 12 | 4-(p-methoxyphenyl)bicyclo-[2.2.2]oct-2-ene-1-carboxylic acid ethyl ester. | 4-(p-methoxyphenyl)-bicyclo-[2.2.2]oct-2-ene-1-carboxylic acid, M.P. 299–300° C. |
| 13 | 4-(p-methoxyphenyl)bicyclo-[2.2.2]octane-1-carboxylic acid ethyl ester. | 4-(p-methoxyphenyl)-bicyclo-[2.2.2]octane-1-carboxylic acid, M.P. 275–276° C. |
| 14 | 4-(p-ethoxyphenyl)bicyclo-[2.2.2]oct-2-ene-1-carboxylic acid ethyl ester. | 4-(p-ethoxyphenyl)bicyclo-[2.2.2]oct-2-ene-1-carboxylic acid. |
| 15 | 4-(p-ethoxyphenyl)bicyclo-[2.2.2]octane-1-carboxylic acid ethyl ester. | 4-(p-ethoxyphenyl)bicyclo-[2.2.2]octane-1-carboxylic acid, M.P. 286–287° C. |

The bicyclooctene acids can be readily converted to the bicyclooctane acids by catalytic hydrogenation by the following procedure.

EXAMPLE 16

A mixture of 0.2 mole of 4-phenylbicyclo[2.2.2]oct-2-ene-1-carboxylic acid, 200 ml. of glacial acetic acid and 3 g. of 10% Pd on charcoal is hydrogenated at 60° C. at 3 atm. pressure in a shaker apparatus over a period of 16 hours. The reaction product is run into a thimble in a Soxhlet apparatus and the catalyst is continuously extracted. The acetic acid solution is then allowed to cool, and the 4 - phenylbicyclo[2.2.2]octane-1-carboxylic acid crystallizes. The crystals are filtered off and are dried, M.P. 287–289° C.

EXAMPLE 17

A mixture of 0.03 mole of 4-(p-methoxyphenyl)bicyclo [2.2.2]octane-1-carboxylic acid ethyl ester, 100 ml. of glacial acetic acid, and 50 ml. of 48% hydrobromic acid is refluxed for 16 hours. The mixture is allowed to cool, and crystals separate. The crystals are filtered off, washed with water, and dried to give 4-(p-hydroxyphenyl)bicyclo [2.2.2]octane-1-carboxylic acid acetic acid mono solvate, M.P. 299–300° C.

Repeating the procedure of Example 17 with an equivalent amount of 4 - (p-methoxyphenyl)bicyclo[2.2.2]oct-2-ene-1-carboxylic acid ethyl ester yields 4-(p-hydroxyphenyl)bicyclo[2.2.2]oct-2-ene-1-carboxylic acid.

EXAMPLE 18

A Soxhlet extractor with Linde Molecular Sieve type 5A, 1/16 inch in the thimble and 0.1 mole of 4-phenylbicyclo[2.2.2]oct-2-ene-1-carboxylic acid. 0.5 g. of p-toluenesulfonic acid, and 250 ml. of methyl alcohol in the flask is refluxed for 16 hours. The solution is cooled and is evaporated. The residue is dissolved in dichloromethane. The solution is washed with $NaHCO_3$ solution, is dried with anhydrous $MgSO_4$, and is evaporated to give 4-phenylbicyclo[2.2.2]oct-2-ene-1-carboxylic acid methyl ester.

EXAMPLES 19–21

The procedure of Example 18 is repeated, substituting an equivalent amount of the listed "Acid" for the 4-phenylbicyclo[2.2.2]oct-2-ene-1-carboxylic acid of Example 18 and using the appropriate alcohol for the methanol of Example 18 to obtain the listed "Ester."

| Ex. | Acid | Ester |
|---|---|---|
| 19 | 4-phenylbicyclo[2.2.2]-octane-1-carboxylic acid. | 4-phenylbicyclo[2.2.2]-octane-1-carboxylic acid methyl ester. |
| 20 | 4-(p-hydroxyphenyl)-bicyclo-[2.2.2]octane-1-carboxylic acid. | 4-(p-hydroxyphenyl)-bicyclo-[2.2.2]octane-1-carboxylic acid methyl ester. |
| 21 | 4-(p-methoxyphenyl)-bicyclo-[2.2.2]octane-1-carboxylic acid. | 4-(p-methoxyphenyl)-bicyclo-[2.2.2]octane-1-carboxylic acid butyl ester. |

EXAMPLE 22

A mixture of 0.010 mole of 4-(p-hydroxyphenyl)-bicyclo[2.2.2]octane-1-carboxylic acid, 50 ml. of acetic anhydride, and 4 g. (0.050 mole) of anhydrous sodium acetate is refluxed for 1 hour. The mixture is cooled, 20 ml. of water is added, and the mixture is stirred overnight. The product is evaporated at reduced pressure. The residue is dissolved in a mixture of water and chloroform. The chloroform extract is washed with water, dried with anhydrous $MgSO_4$, and evaporated. The residue is recrystallized from nitromethane to give 4-(p-acetoxyphenyl)bicyclo[2.2.2]octane-1-carboxylic acid, M.P. 290–300° C. (dec.).

*Analysis.*—Calcd. for $C_{17}H_{20}O_4$ (percent): C, 70.81; H, 6.99. Found (percent): C, 71.05; H. 7.01.

EXAMPLES 23–26

The procedure of Example 21 is adaptable to the preparation of esters of longer chain acids, except that it is usually preferable to use an inert high-boiling solvent, such as xylene, and a molar equivalent or more of acid anhydride per mole of 4-(p-hydroxyphenyl)bicyclo[2.2.2] octane-1-carboxylic acid. Satisfactory results are also obtained when 4-(p-hydroxyphenyl)bicyclo[2.2.2]oct-2-ene-1-carboxylic acid is used in place of 4-(p-hydroxyphenyl)-bicyclo[2.2.2]octane-1-carboxylic acid. When higher molecular weight fatty acid anhydrides as listed below are employed in place of the acetic anhydride of Example 21, the desired "Ester" as listed below is conveniently separated by column chromatography.

| Ex. | Anhydride | Ester |
|---|---|---|
| 23 | Propionic | 4-(p-propionoxyphenyl)bicyclo[2.2.2]-octane-1-carboxylic acid. |
| 24 | Butyric | 4-(p-butyroxyphenyl)bicyclo[2.2.2]oct-2-ene-1-carboxylic acid. |
| 25 | Isobutyric | 4-(p-isobutyroxyphenyl)bicyclo[2.2.2]-oct-2-ene-1-carboxylic acid. |
| 26 | Dodecanoic | 4-(p-dodecanoyloxyphenyl)bicyclo[2.2.2]-octane-1-carboxylic acid. |

Carboxylic acid esters of 4-(p-hydroxyphenyl)bicyclo[2.2.2]octane-1-carboxylic acid methyl ester and ethyl ester can also be esterified at the p-hydroxy group by the procedures of Examples 21 through 25 and the modifications described therein.

As will be recognized by those skilled in the art, salts of the 4-arylbicyclo[2.2.2]octylcarboxylic acids can be readily formed in the following manner. A mixture of 0.1 mole of arylbicyclo[2.2.2]oct-2-ene-1-carboxylic acid and 0.1 equivalent of alkali hydroxide, alkaline earth carbonate, or ammonium hydroxide in 250 ml. of water is heated until all of the acid has dissolved. An excess of $NH_4OH$ is advantageous due to the tendency to lose $NH_3$ during the heating. The solution is allowed to cool, and the salt is allowed to crystallize. The crystals are filtered off, are washed with a minimum of cold water, and are dried to give salts such as the following:

4-(p-methoxyphenyl)bicyclo[2.2.2]octane-1-carboxylic acid sodium salt 4-(p-ethoxyphenyl)bicyclo[2.2.2]oct-2-ene-1-carboxylic acid potassium salt 4-(p-hydroxyphenyl)bicyclo[2.2.2]octane-1-carboxylic acid ammonium salt 4-(p-hydroxyphenyl)bicyclo[2.2.2]oct-2-ene-1-carboxylic acid magnesium salt The compounds for this invention can be administered to prevent pregnancy according to the method of this invention by any suitable means. For example, administration can be parenterally, that is subcutaneously or intramuscularly. Alternatively administration can be by the oral or rectal route. These compounds can be administered in single or divided doses for from 0 to 15 days after coitus.

It is preferred that these compounds be administered in a single dose after coitus, but before estimated time of implantation of the fertilized egg in the uterus.

The dosage administered will be dependent upon age, health and weight of the recipient and also upon the frequency of administration. Generally, from 0.001 to 50 mg./kg.-day of active ingredient for one or more days is effective to obtain the desired result.

A dosage of from 0.005 to 10 mg./kg.-day is preferred with the most preferred dosage being in the range of from 0.01 to 5 mg./kg.-day.

These compounds have shown outstanding inhibition of pregnancy in rats as will be seen from the following example. Therefore, the method of this invention can be used in addition to, or as a replacement for, presently known rodent control methods.

EXAMPLE 27

Immature rats (28 days old) are induced into precocious puberty with a single dose of pregnant mare's serum gonadotrophin and then are mated with normal males. A suspension of 4-(p-hydroxyphenyl)bicyclo[2.2.2]octane-1-carboxylic acid in sesame oil is administered orally daily for six days starting on the day of finding sperm or a vaginal plug. One week after mating, the animals are killed and uteri are examined for implantation sites. If any are found, the animal is considered pregnant. Control animals have a mean of eight implantation sites.

When a series of graded doses is administered, the dose at which fifty percent of the animals show no evidence of pregnancy, the $ED_{50}$, is found to be 0.31 mg./kg.-day.

The test of Example 27 is repeated substituting 4-(p-methoxyphenyl)bicyclo[2.2.2]octane-1-carboxylic acid for the compound used in the above test. The $ED_{50}$ is found to be between 0.31 and 1.2 mg./kg.-day.

The method of administering a single dose of a compound of this invention is also demonstrated. The above test procedure is again repeated except that the compounds of this invention are administered in a single oral dose to female rats on the third day, approximately fifty-three hours after mating.

When a graded series of doses of 4-(p-methoxyphenyl)bicyclo[2.2.2]oct-2-ene-1-carboxylic acid is administered in this fashion, the $ED_{50}$ is found to be 0.86 mg./kg.-day.

The compounds for the method of this invention can also be employed with equally satisfactory results to prevent pregnancy in other warm-blooded animals such as mice, guinea pigs, rabbits, monkeys, chimpanzees, swine, cows, sheep and horses. In small animals it is usually convenient to administer the compound of this invention in the form of a capsule, or incorporated in the feed of the animal. However, when these compounds are administered to large animals, it is often more convenient to administer them parenterally.

The active ingredients for the method of this invention can be employed in useful compositions according to the present invention in such dosage forms as tablets, capsules, powder packets, or liquid solutions, suspensions, or elixirs, for oral administration or liquid solutions for parenteral use, and in certain cases, suspensions for parenteral use. In such compositions, the active ingredient will ordinary always be present in an amount of at least 0.01% by weight based on the total weight of the composition and not more than 90% by weight. A mixture of two or more compounds contemplated by the present invention can be used instead of a single active ingredient.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will contain from about 0.1–75% by weight of a 4-phenylbicyclo[2.2.2]octane, or oct-2-ene, -1-carboxylate for this invention and 99.9–25% of a carrier. In another embodiment, the active ingredient is tableted with or without adjuvants. In yet another embodiment, the active ingredient is put into powder packets and employed. These capsules, tablets, and powders will generally constitute from about 0.5% to about 95% and preferably from 1% to 50% by weight of active ingredient. These dosage forms preferably contain from about 0.5 to about 250 milligrams of active ingredient, with from about 1 milligram to about 50 milligrams most preferred.

The pharmaceutical carrier can, as previously indicated be a sterile liquid such as water and oils, including those of petroleum, animal, vegetable or synthetic origin, for example peanut oil, soybean oil, mineral oil, sesame oil, and the like. In general water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 25%, and preferably about 0.1% to 5% by weight of the active ingredient.

As mentioned above, oral administration can be in a suitable suspension, syrup or elixir in which the active ingredient ordinarily will constitute from about 0.01 to 5% and preferably about 0.05 to 1% by weight. The pharmaceutical carrier in such composition can be an aqueous vehicle such as an aromatic water, a syrup or a pharmaceutical mucilage.

Suitable pharmaceutical carriers are described in "Remington's Pharmaceutical Sciences" by E. W. Martin, a well-known reference text in this field.

In addition to the exemplary illustrations above, the following examples further explain one aspect of the present invention.

EXAMPLE 28

A large number of unit capsules are prepared for oral administration by filling standard two-piece hard gelatin capsules with 10 milligrams of powdered 4-(p-methoxyphenyl)bicyclo[2.2.2]oct-2-ene-1-carboxylic acid, sodium salt, 342 milligrams of lactose, 8 mg. of magnesium stearate and 40 mg. of talc.

EXAMPLE 29

A large number of unit capsules are prepared for oral administration by filling soft gelatin capsules with a solution of 4-(p-ethoxyphenyl)bicyclo[2.2.2]oct-2-ene-1-carboxylic acid ethyl ester in sesame oil.

EXAMPLE 30

A large number of tablets are prepared by conventional procedures so that the dosage unit is 5 milligrams of active ingredient, 82.9 milligrams of anhydrous lactose, 2 milligrams of magnesium stearate and 10 milligrams of microcrystalline cellulose and 0.1 mg. pyrogenic silica. Slow release tablets can also be prepared by applying appropriate coatings.

EXAMPLE 31

A parenteral composition suitable for administration by injection is prepared by stirring 0.5% by weight of 4-(p-hydroxyphenyl)bicyclo[2.2.2]octane - 1 - carboxylic acid methyl ester in sesame oil and sterilizing the solution.

EXAMPLE 32

Suppositories suitable for rectal administration can be prepared by stirring 0.25% by weight of 4-(p-hydroxyphenyl)bicyclo[2.2.2]octane - 1 - carboxylic acid methyl ester in melted theobroma oil and molding the mass into two-gram suppositories.

A large variety of compositions according to this invention can thus readily be made by substituting other compounds for this invention, and including specifically, but not limited to, compounds for this invention that have specifically been named hereinbefore. The compounds will be used in the amounts indicated in accordance with procedures well known and described in the Martin text mentioned above.

We claim:

1. A method for preventing pregnancy in warm-blooded animals which comprises administering to the female animal within 0 to 15 days after coitus an effective amount of from 0.001 to 50 milligrams per kilogram of body weight per day for one or more days within said 0 to 15 days period of a compound of the formula

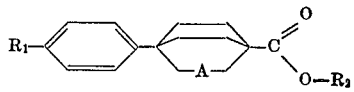

wherein
A is selected from the group consisting of a single bond and a double bond;
$R_1$ is selected from the group consisting of hydrogen, —OH, —OCH$_3$, —OC$_2$H$_5$, —OC$_3$H$_7$, —OC$_4$H$_9$ and

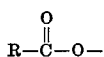

where R is alkyl of from one through twelve carbons; and
$R_2$ is selected from the group consisting of —H, alkyl of 1 through 4 carbon atoms and a cation selected from the group consisting of Na$^\oplus$, K$^\oplus$, NH$_4^\oplus$, and Mg$^{\oplus\oplus}$.

2. The method of claim 1 wherein the active compound administered is a compound of the formula

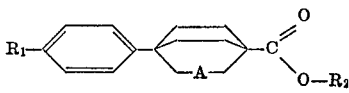

wherein
A is selected from the group consisting of a single bond and a double bond;
$R_1$ is selected from the group consisting of hydrogen, —OH, —OCH$_3$, —OC$_2$H$_5$ and

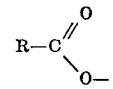

where R is an alkyl of from one through four carbons; and
$R_2$ is selected from the group consisting of hydrogen, CH$_3$, C$_2$H$_5$ and a cation selected from the group Na$^\oplus$, K$^\oplus$, NH$_4^\oplus$, and Mg$^{\oplus\oplus}$.

3. The method of claim 1 wherein the compound being administered is 4-(p-hydroxyphenyl)bicyclo[2.2.2]octane-1-carboxylic acid.

4. The method of claim 1 wherein the compound being administered is 4 - (p - methoxyphenyl)bicyclo[2.2.2]octane-1-carboxylic acid.

5. A method of claim 1 wherein the dose administered to the female animal is 0.005 to 10 milligrams per kilogram of body weight per day.

6. A method of claim 5 wherein the dose is 0.01 to 5 milligrams per kilogram of body weight per day.

7. A pharmaceutical composition in the form of capsule, tablet, or sterile, injectable solution or suspension effective for preventing pregnancy in warm-blooded animals when administered to a female animal, said composition comprising:

(a) from 0.01 to 90% by weight of an effective amount of at least one compound of the formula

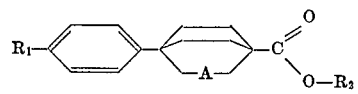

wherein
A is selected from the group consisting of a single bond and a double bond;
$R_1$ is selected from the group consisting of hydrogen, —OH, —OCH$_3$, —OC$_2$H$_5$, —OC$_3$H$_7$, —OC$_4$H$_9$ and

where R is alkyl of from one through twelve carbons; and
$R_2$ is selected from the group consisting of —H, alkyl of one through four carbons and a cation selected from the group Na$^\oplus$, K$^\oplus$, NH$_4^\oplus$ and Mg$^{\oplus\oplus}$; and
(b) a pharmaceutically acceptable diluent.

8. A pharmaceutical composition in the form of capsule, tablet, or sterile, injectable solution or suspension effective for preventing pregnancy in warm-blooded animals when administered to a female animal, said composition comprising:

(a) from 0.01 to 90% by weight of an effective amount of at least one compound of the formula

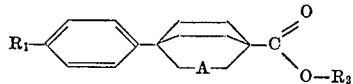

wherein
A is selected from the group consisting of a single bond and a double bond;
$R_1$ is selected from the group consisting of hydrogen, —OH, —OCH$_3$, —OC$_2$H$_5$ and

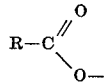

where R is an alkyl of from the through four carbon atoms; and $R_2$ is selected from the group consisting of hydrogen, $CH_3$, $C_2H_5$ and a cation selected from the group $Na^\oplus$, $K^\oplus$, $NH_4^\oplus$, and $Mg^{\oplus\oplus}$; and (b) a pharmaceutically acceptable diluent.

References Cited

UNITED STATES PATENTS

| | | | |
|---|---|---|---|
| 3,308,160 | 3/1967 | Snyder | 260—570.5 |
| 3,419,598 | 12/1968 | Kauer | 260—468 |
| 3,564,060 | 2/1971 | Aldrich et al. | 260—613 |

OTHER REFERENCES

Baker et al., 32, J. Org. Chem., 3344–3348 (1967).

JEROME V. GOLDBERG, Primary Examiner

A. J. ROBINSON, Assistant Examiner

U.S. Cl. X.R.

424—308